United States Patent Office 3,389,999
Patented June 25, 1968

3,389,999
METHODS FOR ACHIEVING THE CHEMICAL PRESERVATION OF BEER AND RESULTANT BEER COMPOSITIONS
Frede B. Strandskov, North Caldwell, and John B. Bockelmann, Tenafly, N.J., assignors to The F. & M. Schaefer Brewing Co., Brooklyn, N.Y.
No Drawing. Filed Oct. 6, 1964, Ser. No. 401,997
16 Claims. (Cl. 99—48)

ABSTRACT OF THE DISCLOSURE

Beer is chemically preserved by intimately mixing therewith:
(A) a mixture of:
(1) a compound of the formula

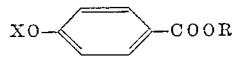

wherein X is a member selected from the group consisting of H, alkali metal, and alkaline earth metal, and
R is a member selected from the group consisting of octyl and heptyl, and
(2) benzylbromoacetate, or
(B) a mixture of:
(1) a compound of the formula

wherein X is a member selected from the group consisting of H, alkali metal, and alkaline earth metal, and
R is a member selected from the group consisting of octyl and heptyl, and
(2) a compound of the formula

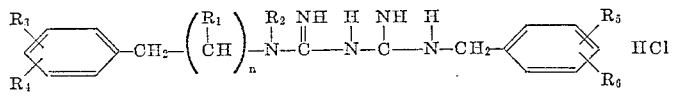

wherein $R_1$ is a member selected from the group consisting of H and phenyl, and $R_2$ represents a member selected from the group consisting of H, and lower alkyl, and
$R_3$, $R_4$, $R_5$, and $R_6$ represent the same or different members selected from the group consisting of H, halogen and lower alkyl, and $n$ is a member selected from the group consisting of 0 and 1.

The invention also provides the resultant chemically preserved beer compositions.

---

The present invention relates to the chemical preservation of beer and more particularly it relates to a mode of adding chemical compounds in special combinations to the beer to effect preservation and to the compositions comprising the beer and the chemical additives prepared by the method of the invention.

It is a desideratum in the beer-making art to eliminate the necessity for the pasteurization and/or refrigeration of beer. This is due to both the deleterious effects of the pasteurization on the properties of the beer, as for example on the taste, as well as to the realization of savings in cost per unit of production.

It is known that beer may be preserved against microbial growth, and spoilage thus prevented, by the addition to the finished beer of the heptyl or octyl ester of para-hydroxybenzoic acid or an alkali metal (e.g. Na, K, etc.) or alkaline earth metal (e.g. Ca, etc.) salt thereof. The discovery of the use of these compounds in preserving beer represented a great advance in the art of beer making and provided a means by which the disadvantages attendant upon the pasteurization and/or refrigeration of the beer could be avoided.

A further advance in the art of beer making and the preservation of beer has now been made. This is based on the fact that the preservation of beer may be accomplished and that undesirable microbial growth may be prevented by means of the heptyl or octyl ester of para-hydroxybenzoic acid or an alkali metal or alkaline earth metal salt thereof in conjunction with an additional chemical compound. Such combination of additives makes it possible to obtain the desirable attributes incident to the chemical preservation of beer as set forth above, while minimizing any undesired effects flowing from the individual use thereof.

The generic term "beer," in the instant specification and claims, has reference to, i.e. is inclusive of bock beer, porter, and stout, as well as lager beer. Ale and malt liquor are also intended. Further, the said generic term applies equally as well to concentrated and reconstituted beers. Also, it is of no consequence how the beer is packaged, e.g. in cartons, bottles, can or kegs or tank trucks; the present invention applies in each case.

Throughout the entire disclosure, the relationship between parts by weight and parts by volume is the same as that between grams and milliliters (ml.); parts per million (p.p.m.) are uniformly parts by weight of additament (additive) per million parts by volume of finished product. The beer used is the same throughout the disclosure.

In the first aspect of the instant invention, it relates to the preservation of beer by incorporating into the beer for intimate admixture therewith a combination of (a) the compound benzylbromoacetate of the formula

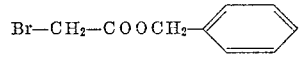

and (b) a compound of the formula

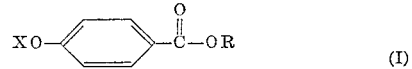 (I)

wherein X represents H, an alkaline earth metal or an alkali metal, and
R represents octyl or heptyl, e.g., n-octyl or n-heptyl.

Research has established that the preservation of beer of any type with benzylbromoacetate alone is simply not commercially feasible. The amount of the compound required to obtain an acceptable level of preservation produces such adverse effects upon the beer that it is not a saleable product. According to the present invention, however, the benzylbromoacetate is employed in conjunction with a para-hydroxybenzoic acid ester compound (I) as set forth above, the level of preservation necessary is attained by using amounts of the benzylbromoacetate which do not produce the undesirable effects upon the beer as stated above. In addition, the amount of the benzoate ester (I) employed can be significantly reduced. The amount can, in fact, be reduced more than the corresponding amount of the benzylbromoacetate utilized since, as in the preceding aspect of the invention, there exists a synergistic action in the preservation with the combination of additaments. Thus, the magnitude of preservation obtained with the combination of the additives is greater than the sum of the effects of the individual additives when employed alone. This also represents a quite unexpected and wholly unforeseeable result, and a great advance in the art.

The method employed comprises incorporating into the beer for intimate admixture therewith the specific amount of each of the chemical additaments, the amount of each being calculated so that the effect achieved is the inhibition of undesirable microbial growth and thus the prevention of spoilage. The amounts employed will vary in accordance with the type of beer preserved and the length of time for which prevention of spoilage must be assured. Also, the amount employed will depend upon specific benzoic acid ester utilized. In general, however, the benzoic acid ester compound (I) can be used in an amount of from about 2 to about 15 p.p.m., the preferred amount being from about 4 to about 8 p.p.m. The benzylbromoacetate is employed in an amount ranging from 1 to about 10 p.p.m., the preferred amount being from about 1 to about 3 p.p.m.

The additives can be added to the beer in any form which will not adversely affect the properties of the beer. For example, they may be added in the form of individual stock solution of the compounds dissolved in a solvent therefor, or they may be combined in the appropriate proportions and a single stock solution prepared. The latter alternative is preferred from the standpoint of convenience. The solvent used for preparing the stock solution may be any which does not interfere with the preservation and which itself does not cause adverse effects upon the beer. In this respect there can be used, e.g. ethanol or propylene glycol.

The additives are incorporated into the beer at any time during the preparation provided that they will not interfere with a subsequent processing stage in the beer manufacture and provided that a further processing stage will not interfere with their effectiveness in the beer. It is advantageous to add them to the finished beer after the polish filtration. When referring to "finished" beer herein, it is intended to refer to beer which contains all the necessary additives to make it a commercially acceptable product and which has been subjected to polish filtration.

The following examples are illustrative of this aspect of the invention. Note that they are merely illustrative and are not exhaustive or limitative thereof.

The following stock solutions are prepared for use in the examples illustrating this aspect of the invention.

Stock solution No. 1

Dissolve 350 milligrams (mgms.) of n-heptyl parahydroxybenzoate in a sufficient amount of 95% ethanol to make 100 ml. of solution. The addition of 0.5 ml. of this solution, containing 1.75 mgms. of the n-heptyl para-hydroxybenzoate to 350 ml. of beer yields a solution of 5 p.p.m. of the benzoate.

Stock solution No. 2

Dissolve 70 mgms. of benzylbromoacetate in a sufficient amount of 95% ethanol to make 100 ml. of solution. The addition of 0.5 ml. of this solution, containing 0.35 mgms. of the benzylbromoacetate, to 350 ml. of beer yields a solution containing 1.0 p.p.m. of the benzylbromoacetate.

Stock solution No. 3

Dissolve 350 mgms. of n-heptyl para-hydroxybenzoate and 70 mgms. of benzylbromoacetate in a sufficient amount of 95% ethanol to make 100 ml. of stock solution. The addition of 0.5 ml. of this solution, containing 1.75 mgms. of the n-heptyl para-hydroxybenzoate and 0.35 mgms. of the benzylbromoacetate, to 350 ml. of beer yields a solution containing 5 p.p.m. of the n-heptyl parahydroxybenzoate and 1.0 p.p.m. of the benzylbromoacetate.

Example I

From the regular production line, fill each of a group of clean 12 ounce (oz.) brown beer bottles with 12 oz. of cold, unpasteurized finished beer into which no chemical additive has been incorporated. Foam up the beer to expel headspace air, and cap. Each of these bottles contains 350 ml. of unpasteurized lager beer. These bottles are utilized as the control in the examples. Store these bottles at room temperature (about 15 to 30° C.), periodically (weekly) examining them for microbiological spoilage.

EXAMPLE A

Into each of several 12 oz. brown beer bottles place 0.5 ml. of Stock Solution No. 1. Fill these bottles from the regular production line with cold, unpasteurized beer. Foam up the beer to expel headspace air, and cap. Each of these bottles contains 350 ml. of the beer together with the stock solution. Store these bottles at room temperature (about 15 to 30° C.), periodically examining them for microbiological spoilage (weekly). Such spoilage may be readily observed by a marked amount of sediment in the beer and by the unpleasant taste and odor produced by the microbial growth and metabolism.

EXAMPLE B

Into each of several 12 oz. brown beer bottles place 0.5 ml. of Stock Solution No. 2. Fill these bottles from the regular production line with cold, unpasteurized beer. Foam up the beer to expel headspace air, and cap. Each of these bottles contains 350 ml. of the beer together with the stock solution. Store these bottles at room temperature (about 15 to 30° C.), periodically examining them for microbiological spoilage (weekly).

EXAMPLE C

Into each of several 12 oz. brown beer bottles place 0.5 ml. of Stock Solution No. 3. Fill these bottles from the regular production line with cold, unpasteurized beer. Foam up the beer to expel headspace air, and cap. Each of these bottles contains 350 ml. of the beer together with the stock solution. Store these bottles at room temperature (about 15 to 30° C.), periodically examining them for microbiological spoilage (weekly).

The following table sets forth the results which are obtained in the foregoing examples.

TABLE A

| P.P.M. n-heptyl parahydroxybenzoate | P.P.M. benzylbromoacetate | Microbiologically sound after— | Microbiologically spoiled after— |
|---|---|---|---|
| Control [1] | | 2 Weeks | 3 Weeks. |
| A. 5 | 0 | 5 Weeks | 7 Weeks. |
| B. 0 | 1.0 | do | Do. |
| C. 5 | 1.0 | >20 Weeks | |
| Pasteurized Control [2] | | | do |

[1] The control product is beer prepared as in Example I to which no additive had been introduced.
[2] The pasteurized control is beer prepared as in Example I to which no additive had been introduced and which had been subjected to standard pasteurization procedure.

This table shows that the beer preserved with the n-heptyl para-hydroxybenzoate alone spoiled between the fifth and the seventh weeks as did the beer preserved with the benzylbromoacetate alone. The beer preserved with the combination of the additives, however, was unspoiled after more than 20 weeks of storage under the same conditions. This is indicative of a synergistic action exhibited by the combination in the preservative of the beer.

In producing beer preserved against microbial growth in accordance with this invention in commercial production quantities, the following procedure is as follows:

A stock solution is prepared containing the additives in such amount that 2 gal. of the stock solution equally distributed throughout 100 barrels of beer gives the desired concentration of the additives in the beer. The stock solution is injected into the beer pipeline at the desired stage of production of the beer as the beer flows through the line. The rate of injection into the line is correlated to the flow rate of the beer through the line. This correlation may be achieved through methods known in the art, as for example flow meters. This method insures a thorough admixture of the stock solution with the beer. The beer containing the additives intimately admixed therewith is then filled into bottles, cans or kegs as desired.

In like manner, the octyl ester as well as the salts of the compounds can be employed with similar success.

A still further aspect of the instant invention relates to the preservation of beer utilizing a combination of (a) a compound of the formula

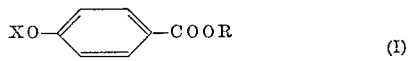

wherein X represents H, alkaline earth metal, or alkali metal, and

R represents octyl and heptyl, e.g., n-octyl or n-heptyl, and (b) a compound of the formula

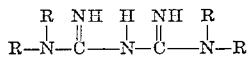

wherein the R groups are the same or different phenyl alkyl or substituted phenyl alkyl groups, the substituents being for example halogen, alkyl or phenyl groups. The compounds are preferably employed as the acid addition salts. A preferred group of biquanide compounds is that group encompassed by the formula

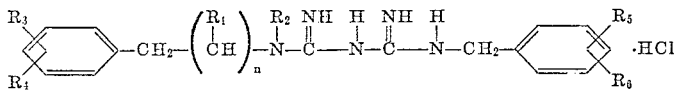

wherein $R_1$ is H or phenyl, and $R_2$ represents H, or lower alkyl, e.g. methyl, and $R_3$, $R_4$, $R_5$, and $R_6$ represent the same or different groups and are H, halogen, e.g. chlorine or iodine, or lower alkyl, e.g. methyl, and $n$ is 0 or 1.

Examples of compounds falling within the latter formula are for example the following:

$N^1$-benzyl-$N^5$-(o-chlorobenzyl)biguanide,HCl
$N^1$-p-iodobenzyl-$N^5$-(p-chlorobenzyl)biguanide,HCl
$N^1$-o-iodo-β-phenethyl-$N^5$-(p-chlorobenzyl)biguanide, HCl
$N^1$-benzyl-$N^5$-(2,4-dichlorobenzyl)biguanide,HCl
$N^1$-p-methylbenzyl-$N^5$-(2,4-dichlorobenzyl)biguanide, HCl
$N^1$-o-chlorobenzyl-$N^5$-(2,4-dichlorobenzyl)biguanide, HCl
$N^1$-p-chlorobenzyl-$N^5$-(2,4-dichlorobenzyl)biguanide, HCl
$N^1$-3,4-dimethylbenzyl-$N^5$-(2,4-dichlorobenzyl)biguanide,HCl
$N^1$-3,4-dichlorobenzyl-$N^5$-(2,4-dichlorobenzyl)biguanide,HCl
$N^1$-p-chlorobenzyl-$N^5$-(3,4-dichlorobenzyl)biguanide, HCl
$N^1$-1,2-diphenylethyl-$N^5$-(3,4-dichlorobenzyl)biguanide, HCl
$N^1$-o-chlorobenzyl-$N^1$-methyl-$N^5$-(2,4-dichlorobenzyl)biguanide,HCl It has been found not to be feasible to accomplish the desired preservation of beer against microbial growth solely by the incorporation into the beer of a biguanide compound such as those set forth above. This appears to be due to the fact that in order to obtain the desired level of preservation it is necessary to utilize such a large amount of the biguanide compound that undesirable properties, for example haze formation, are imparted to the beer and it is not saleable.

Through this aspect of the instant invention it has been found that it is possible to accomplish the desired preservation of beer by adding thereto for intimate admixture therewith a combination of the benzoate ester compound (I) and the biguanide compound. In this manner it is possible to reduce the amount of the biguanide compound to an amount which does not impart undesirable properties to the beer. Unexpectedly it has also been found that the amount of the benzoate ester compound employed may be more than correspondingly reduced. This is due to the fact that the combination of additives displays synergistic action when compared to the components utilized individually.

The addition of the additives to the beer may be made by admixing into the beer the individual additives separately or through a mixture of the additives in appropriate proportions. The latter alternative is most convenient and is thus preferred. The addition is preferably in the form of a stock solution of the compound or compounds dissolved in a solvent therefor. The solvent may be any which does not impart adverse properties to the beer, as for example propylene glycol or ethanol.

The additives may be added to the beer at any time during the processing of the beer provided the addition does not interfere with the beer making process or provided that the beer making process does not impair the effectiveness of the additives. It is preferred to add the compounds to the finished beer after the polish filtration.

The amounts of the additives used will vary depending upon the specific compound utilized as well as upon the type of beer being preserved. In general, however, the biguanide compound is employed in an amount of from about 2 to 50 p.p.m., the range of about 2 to about 25 p.p.m. being preferred. The benzoate ester compound (I) may be used in an amount ranging from about 2 to about 15 p.p.m., the range of from about 4 to about 8 p.p.m. being preferred.

The following examples will illustrate the present aspect of the invention. The examples are merely illustrative.

Stock solution No. 4

Dissolve 700 mgms. of $N^1$-benzyl-$N^5$-(o-chlorobenzyl) biguanide hydrochloride in a sufficient amount of 95% ethanol to make 100 ml. of solution. The addition of 1.0 ml. of this solution, containing 7.0 mgms. of the biguanide compound, to 350 ml. of beer yields a solution containing 20 p.p.m. of the biguanide compound.

Stock solution No. 5

Dissolve 175 mgms. of n-heptyl para-hydroxybenzoate and 700 mgms. of $N^1$-benzyl-$N^5$-(o-chlorobenzyl)biguanide hydrochloride in a sufficient amount of 95% ethanol to make 100 ml. of stock solution. The addition of 1.0 ml. of this solution containing 1.75 mgms. of the benzoate and 7.0 mgms. of the biguanide, to 350 ml. of beer yields a solution containing 5 p.p.m. of the benzoate and 20 p.p.m. of the biguanide.

In the same manner as above, additional stock solutions are prepared containing desired concentrations of the various biguanide compounds, either alone or in combination, with a desired concentration of the n-heptyl parahydroxybenzoate. These stock solutions are utilized in the following examples.

EXAMPLE 1

From the regular production line, fill each of a group of clean 12 oz. brown beer bottles with 12 oz. of cold, unpasteurized finished beer into which no chemical additive has been incorporated. Foam up the beer to expel headspace air, and cap. Each of these bottles contains 350 ml. of unpasteurized lager beer. These bottles are utilized as the control in the examples. Store these bottles at room temperature and periodically (weekly) examine them for microbiological spoilage.

contains 350 ml. of beer together with the stock solution. These bottles are then stored at room temperature and periodically examined (weekly) for microbiological spoilage.

The results of all of the examples are set forth in Table 1 below. The table indicates the compounds utilized and the concentration of each.

TABLE 1

| Example | N-heptyl para-hydroxybenzoate (p.p.m.) | Biguanide·HCl (p.p.m.) | Microbiologically sound after (Weeks) | Microbiologically spoiled after (Weeks) |
| --- | --- | --- | --- | --- |
| 1 Control [1] | | | 2 | 3 |
| 2 | 5 | | 5 | 7 |
| 3 | 0 | N¹-benzyl-N⁵-(o-chlorobenzyl)biguanide, 20 | 7 | 8 |
| 4 | 5 | ....do.... | 18 | 22 |
| 5 | 0 | N¹-p-iodobenzyl-N⁵-(p-chlorobenzyl)-biguanide, 20 | 12 | 14 |
| 6 | 5 | ....do.... | 52 | |
| 7 | 0 | N¹-o-iodo-β-phenethyl-N⁵-(p-chlorobenzyl)biguanide 10 | 7 | 8 |
| 8 | 5 | ....do.... | 16 | 18 |
| 9 | 0 | N¹-benzyl-N⁵-(2, 4-dichlorobenzyl)-biguanide, 20 | 7 | 8 |
| 10 | 5 | ....do.... | 18 | 22 |
| 11 | 0 | N¹-p-methylbenzyl-N⁵-(2, 4-dichlorobenzyl)biguanide, 10 | 12 | 14 |
| 12 | 5 | ....do.... | 52 | |
| 13 | 0 | N¹-o-chlorobenzyl-N⁵-(2, 4-dichlorobenzyl)biguanide, 10 | 10 | 12 |
| 14 | 5 | ....do.... | 52 | |
| 15 | 0 | N¹-p-chlorobenzyl-N⁵-(2, 4-dichlorobenzyl)biguanide, 10 | 10 | 12 |
| 16 | 5 | ....do.... | 52 | |
| 17 | 0 | N¹-3, 4-dimethylbenzyl-N⁵-(2, 4-dichlorobenzyl)biguanide, 5 | 12 | 14 |
| 18 | 0 | N¹-3, 4-dimethylbenzyl-N⁵-(2, 4-dichlorobenzyl)biguanide, 10 | 18 | 22 |
| 19 | 5 | N¹-3, 4-dimethylbenzyl-N⁵-(2, 4-dichlorobenzyl)biguanide, 5 | 52 | |
| 20 | 0 | N¹-p-chlorobenzyl-N⁵-(2, 4-dichlorobenzyl)biguanide, 2 | 12 | 14 |
| 21 | 0 | N¹-p-chlorobenzyl-N⁵-(2, 4-dichlorobenzyl)biguanide, 5 | 18 | 22 |
| 22 | 5 | N¹-p-chlorobenzyl-N⁵-(2, 4-dichlorobenzyl)biguanide, 2 | 52 | |
| 23 | 0 | N¹-p-chlorobenzyl-N⁵-(3, 4-dichlorobenzyl)biguanide, 5 | 10 | 12 |
| 24 | 5 | ....do.... | 52 | |
| 25 | 0 | N¹-1, 2-diphenylethyl-N⁵-(3, 4-dichlorobenzyl)biguanide, 5 | 7 | 8 |
| 26 | 5 | ....do.... | 18 | 22 |
| 27 | 0 | N¹-o-chlorobenzyl-N¹-methyl-N⁵-(2, 4-dichlorobenzyl)biguanide, 10 | 12 | 14 |
| 28 | 5 | ....do.... | 52 | |
| Pasteurized Control [2] | | | 52 | |

[1] The control product is beer prepared as in Example 1 to which no additive has been introduced.
[2] The pasteurized control in beer prepared as in Example 1 to which no additive has been introduced and which has been subjected to standard pasteurization procedures.

EXAMPLE 2

Into each of several 12 oz. brown beer bottles place 0.5 ml. of Stock Solution No. 1. Fill these bottles from the regular production line with cold, unpasteurized beer. Foam up the beer to expel headspace air, and cap. Each of these bottles contains 350 ml. of the beer together with the stock solution. Store these bottles at room temperature (about 15 to 30° C.), periodically (weekly) examining them for microbiological spoilage.

EXAMPLE 3

Into each of several 12 oz. brown beer bottles place 1.0 ml. of Stock Solution No. 4. Fill these bottles from the regular production line with cold, unpasteurized beer. Foam up the beer to expel headspace air, and cap. Each of these bottles contains 350 ml. of beer together with the stock solution. Store these bottles at room temperature (about 15 to 30° C.), periodically (weekly) examining them for microbiological spoilage.

EXAMPLE 4

Into each of several 12 oz. brown beer bottles place 1.0 ml. of Stock Solution No. 5. Fill these bottles from the regular production line with cold, unpasteurized beer. Foam up the beer to expel headspace air, and cap. Each of these bottles contains 350 ml. of beer together with the stock solution. Store these bottles at room temperature and examine periodically (weekly) for microbiological spoilage.

EXAMPLES 5 TO 28

In the same manner as in the foregoing examples, into groups of 12 oz. brown beer bottles are placed varying amounts of the various Stock Solutions prepared in the manner of Stock Solutions No. 4 and No. 5. These bottles are then filled from the regular production line with cold, unpasteurized beer. The beer is foamed up to expel headspace air, and the bottles are capped. Each of the bottles contains 350 ml. of beer together with the stock solution. These bottles are then stored at room temperature and periodically examined (weekly) for microbiological spoilage.

From Table 1 it is apparent that a synergistic action is exhibited by the combination of the compounds and that extremely good preservation is obtained when this combination of additives is incorporated into beer.

In producing beer preserved against microbial growth in accordance with this invention in commercial production quantities, the following procedure is followed:

A stock solution is prepared containing the additives in such amount that 2 gal. of the stock solution equally distributed throughout 100 barrels of beer gives the desired concentration of the additives in the beer. The stock solution is injected into the beer pipeline at the desired stage of production of the beer as the beer flows through the line. The rate of injection into the line is correlated to the flow rate of the beer through the line. This correlation may be achieved through methods known in the art, as for example flow meters. This method insures a thorough admixture of the stock solution with the beer. The beer containing the additives intimately admixed therewith is then filled into bottles, cans or kegs as desired.

In the manner as in the foregoing examples, the octyl ester as well as the salts of both the heptyl and octyl ester may be employed and with corresponding success.

Also included within the ambit of the present invention is the addition to beer preserved against microbial spoilage in the manner previously disclosed herein of materials which improve the commercial acceptability of the beer. This includes, but is not limited to the materials which are added to improve the properties known as chill stability and foam adherence of the beer. In order to be commercially acceptable, a beer must possess certain properties; for example it must be sparkling clear. Two additional properties which are most significant to beer connoisseurs are referred to as chill stability and foam adherence. The first of these relates to the property noted above as "sparkling clear." As the name implies, on occasion a haze forms in some beer when it is chilled. As the temperature of the beer is returned to room temperature, the haze disappears, only to reappear upon subsequent rechilling. This haze is referred to as chill haze. The second of these significant properties, foam adherence, is of special importance to the connoisseurs. This property relates to the adherence of the beer foam to the sides of the drinking glass as the foam collapses or as the glass is being emptied. Beer, which in all other respects has excellent potential, may be excluded from the market solely because of the lack of an acceptable level of foam adherence. One of the marks of a beer connoisseur is his appreciation of the significance of beer foam adherence to the sides of the drinking glass. These properties may be enhanced by the addition to the beer of a propylene glycol alginate together with another material such as (a) cobalt; (b) a composition known as FS–26W which is a composition composed of 70% by weight zinc sulfate ($ZnSO_4 \cdot H_2O$), 2.5% by weight calcium disodium ethylenediamine tetraacetic acid, 2.5% by weight glycine, and 25% by weight gum arabic (powder); or (c) a composition known as Seibex (trade name) or Seibel's A, both of which are produced by J. E. Seibel Sons Co., Inc. The amounts of these materials may be varied within amounts which are known in the art as may also the amounts of additional materials which may be added to achieve various desirable attributes in the beer composition. These materials which may be added are limited, of course, to those which do not interact with the preserving components to produce adverse effects upon the beer.

Having described the invention, what is claimed is:

1. The method for preserving beer which comprises incorporating into the beer and intimately mixing therewith
    (a) a compound of the formula

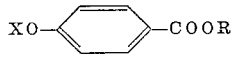

wherein X is a member selected from the group consisting of H, alkali metal, and alkaline earth metal, and
R is a member selected from the group consisting of octyl and heptyl, and
    (b) benzylbromoacetate.

2. The method for preserving beer which comprises incorporating into the finished beer and intimately mixing therewith
    (a) a compound of the formula

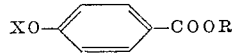

wherein X is a member selected from the group consisting of H, alkali metal, and alkaline earth metal, and
R is a member selected from the group consisting of octyl and heptyl, and
    (b) benzylbromoacetate.

3. The method for preserving beer which comprises incorporating into finished beer and intimately mixing therewith
    (a) from about 2 to about 15 parts, per million parts of total composition, of a compound of the formula

wherein X is a member selected from the group consisting of H, alkali metal, and alkaline earth metal, and
R is a member selected from the group consisting of octyl and heptyl, and
    (b) from about 1 to about 10 parts, per million parts of total composition, of benzylbromoacetate.

4. The method for preserving beer which comprises incorporating into finished beer and intimately mixing therewith
    (a) from about 4 to about 8 parts of n-heptyl parahydroxybenzoate per million parts of total composition, and
    (b) from about 1 to about 3 parts of benzylbromoacetate per million parts of total composition.

5. A composition which comprises finished beer having incorporated therein and intimately admixed therewith
    (a) a compound of the formula

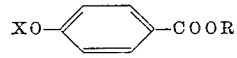

wherein X is a member selected from the group consisting of H, alkali metal, and alkaline earth metal, and
R is a member selected from the group consisting of octyl and heptyl, and
    (b) benzylbromoacetate.

6. A composition which comprises finished beer having incorporated therein and intimately admixed therewith
    (a) from about 2 to about 15 parts, per million of total composition, of a compound of the formula

wherein X is a member selected from the group consisting of H, alkali metal, and alkaline earth metal, and
R is a member selected from the group consisting of octyl and heptyl, and
    (b) from about 1 to about 10 parts, per million parts of total composition, of benzylbromoacetate.

7. A composition which comprises finished beer having incorporated therein and intimately admixed therewith
    (a) from about 4 to about 8 parts of n-heptyl parahydroxybenzoate per million parts of total composition and
    (b) from about 1 to about 3 parts of benzylbromoacetate per million parts of total composition.

8. A method for preserving beer which comprises incorporating into the beer and intimately mixing therewith
    (a) a compound of the formula

wherein X is a member selected from the group consisting of H, alkali metal, and alkaline earth metal, and
R is a member selected from the group consisting of octyl and heptyl, and
    (b) a compound of the formula

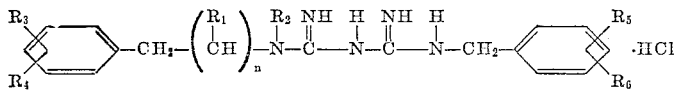

wherein $R_1$ is a member selected from the group consisting of H and phenyl, and
$R_2$ represents a member selected from the group consisting of H, and lower alkyl, and
$R_3$, $R_4$, $R_5$, and $R_6$ represent the same or different members selected from the group consisting of H, halogen and lower alkyl, and
$n$ is a member selected from the group consisting of 0 and 1.

9. A method for preserving beer which comprises incorporating into the finished beer and intimately mixing therewith
    (a) a compound of the formula

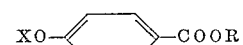

wherein X is a member selected from the group consisting of H, alkali metal, and alkaline earth metal, and R is a member selected from the group consisting of octyl and heptyl, and
(b) a compound of the formula

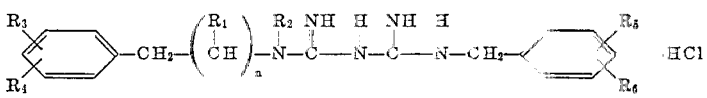

wherein $R_1$ is a member selected from the group consisting of H and phenyl, and
$R_2$ represents a member selected from the group consisting of H, and lower alkyl, and
$R_3$, $R_4$, $R_5$, and $R_6$ represent the same or different members selected from the group consisting of H, halogen and lower alkyl, and
$n$ is a member selected from the group consisting of 0 and 1.

10. A method for preserving beer which comprises incorporating into finished beer and intimately mixing therewith
(a) from about 2 to about 15 parts per million parts of total composition of a compound of the formula

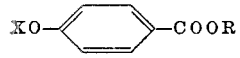

wherein X is a member selected from the group consisting of H, alkali metal, and alkaline earth metal, and R is a member selected from the group consisting of octyl and heptyl, and
(b) from about 2 to about 50 parts per million parts of total composition of a compound of the formula

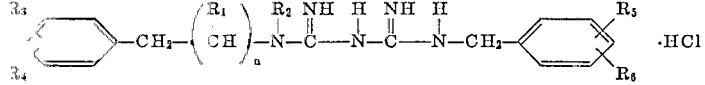

wherein $R_1$ is a member selected from the group consisting of H and phenyl, and
$R_2$ represents a member selected from the group consisting of H, and lower alkyl, and
$R_3$, $R_4$, $R_5$, and $R_6$ represent the same or different members selected from the group consisting of H, halogen and lower alkyl, and
$n$ is a member selected from the group consisting of 0 and 1.

11. A method for preserving beer which comprises incorporating into finished beer and intimately mixing therewith
(a) from about 4 to about 8 parts of n-heptyl parahydroxybenzoate per million parts of total composition, and
(b) about 20 parts of $N^1$-p-iodobenzyl-$N^5$-(p-chlorobenzyl)biguanide·HCl per million parts of total composition.

12. A method for preserving beer which comprises incorporating into finished beer and intimately mixing therewith
(a) from about 4 to about 8 parts of n-heptyl parahydroxybenzoate per million parts of total composition, and
(b) about 10 parts of $N^1$-p-methylbenzyl-$N^5$-(2,4-dichlorobenzyl)biguanide·HCl per million parts of total composition.

13. A composition which comprises finished beer having incorporated therein and intimately admixed therewith
(a) a compound of the formula

wherein X is a member selected from the group consisting of H, alkali metal, and alkaline earth metal, and
R is a member selected from the group consisting of octyl and heptyl, and
(b) a compound of the formula

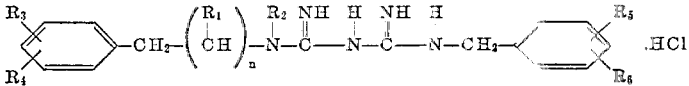

wherein $R_1$ is a member selected from the group consisting of H and phenyl, and
$R_2$ is a member selected from the group consisting of H and lower alkyl, and
$R_3$, $R_4$, $R_5$ and $R_6$ represent the same or different member selected from the group consisting of H, halogen and lower alkyl, and
$n$ is a member selected from the group consisting of 0 and 1.

14. A composition which comprises finished beer having incorporated therein and intimately admixed therewith
(a) from about 2 to about 25 parts per million parts of total composition of a compound of the formula

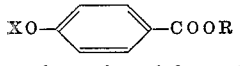

wherein X is a member selected from the group consisting of H, alkali metal, and alkaline earth metal, and
R is a member selected from the group consisting of octyl and heptyl, and
(b) from about 2 to 50 parts per million parts of total composition of a compound of the formula

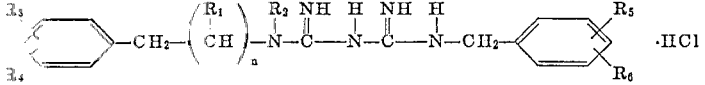

wherein $R_1$ is a member selected from the group consisting of H and phenyl, and
$R_2$ is a member selected from the group consisting of H and lower alkyl, and
$R_3$, $R_4$, $R_5$ and $R_6$ represent the same or different member selected from the group consisting of H, halogen and lower alkyl, and
$n$ is a member selected from the group consisting of 0 and 1.

15. A composition which comprises finished beer having incorporated therein and intimately admixed therewith (a) from about 4 to about 8 parts of n-heptyl para-hydroxybenzoate per million parts of total composition, and (b) about 20 parts $N^1$-p-iodobenzyl-$N^5$-(p-chlorobenzyl)biguanide·HCl per million parts of total composition.

16. A composition which comprises finished beer having incorporated therein and intimately admixed therewith (a) from about 4 to about 8 parts of n-heptyl para-hydroxybenzoate per million parts of total composition, and (b) about 10 parts of $N^1$-p-methylbenzyl-$N^5$-(2,4-dichlorobenzyl)biguanide·HCl per million parts of total composition.

References Cited
UNITED STATES PATENTS

| | | | |
|---|---|---|---|
| 2,722,483 | 11/1955 | Winkler | 99—48 X |
| 2,842,441 | 7/1958 | Kuen | 99—48 |
| 3,175,912 | 3/1965 | Strandskov et al. | 99—48 |
| 3,232,766 | 2/1966 | Strandskov et al. | 99—48 |

ALVIN E. TANENHOLTZ, *Primary Examiner.*

A. LOUIS MONACELL, *Examiner.*

O. M. NAFF, *Assistant Examiner.*